Figure 1:
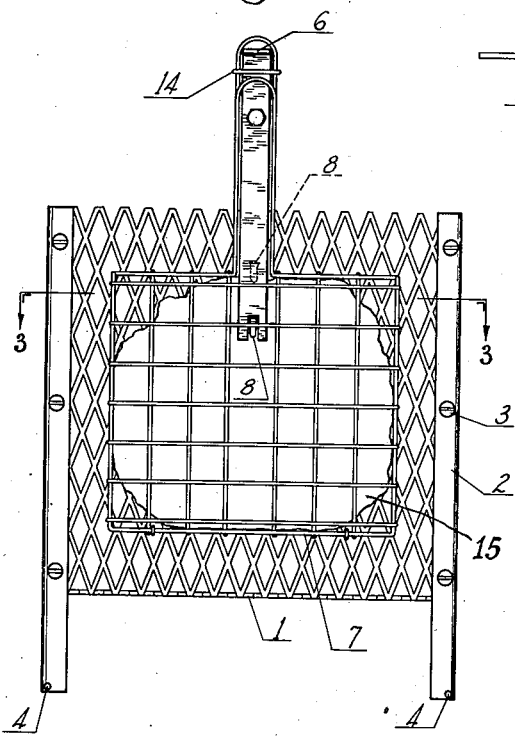

May 21, 1940.  A. J. AVETTA  2,201,756

CHARCOAL GRILL

Filed Dec. 14, 1938

INVENTOR.
Albert J. Avetta
BY William B. Jaspert
ATTORNEY.

Patented May 21, 1940

2,201,756

UNITED STATES PATENT OFFICE 2,201,756

CHARCOAL GRILL

Albert J. Avetta, Pittsburgh, Pa.

Application December 14, 1938, Serial No. 245,621

2 Claims. (Cl. 126—30)

This invention relates to new and useful improvements in charcoal grills for broiling meats, fish, fowl and the like, and it is among the objects thereof to provide a grill which shall provide maximum broiling area with a minimum consumption of charcoal, in which the broiling surfaces are vertically disposed, whereby the fat and juices of the food, when broiling, do not drip on the hot coals, which would produce flames that deposit soot on the food in the conventional form of horizontal broiler.

Another object of the invention is to provide a grill which is compact, durable and of relatively light weight, and in which the grill-supporting base and the food-supporting brackets are removable and constructed to be placed within the grill to facilitate handling and the transportation of the grill.

Figure 2:
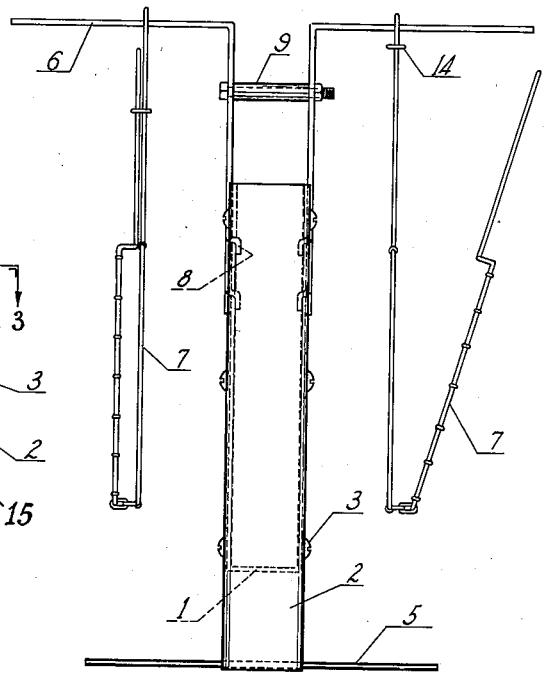
Figure 3:
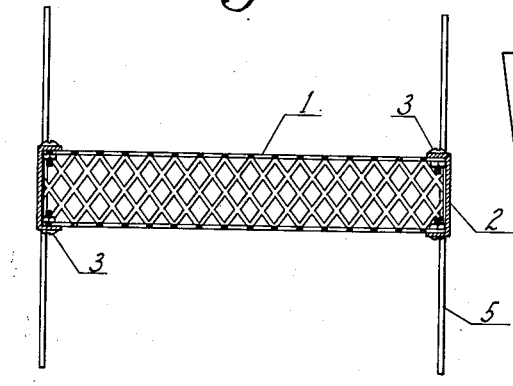
Figure 4:
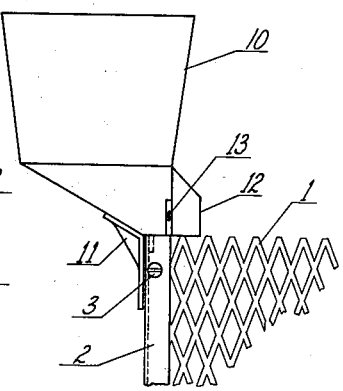

These and other objects of the invention will become more apparent from a consideration of the accompanying drawing constituting a part hereof in which like reference characters designate like parts and in which:

Fig. 1 is a front elevational view of a grill embodying the principles of this invention;

Fig. 2 a side elevational view thereof;

Fig. 3 a top plan view of the grill with the grill-supporting members removed; and Fig. 4 a front elevational view of such a grill, broken away, with one of the top corners, as shown, provided with a hopper for conveniently feeding charcoal to the basket.

In the several figures of the drawing, the structure therein illustrated comprises a basket 1 made of expanded metal or any other perforated metal, the base and sidewalls of which are preferably integrally formed. Channel-shaped end brackets 2 are secured to the basket 1 by bolts, rivets or by welding, the end brackets supplying rigidity and strength to the basket portion 1. As shown in Fig. 1, the basket 1 is spaced from the bottom of the end brackets 2 and the lower portions of the end brackets are provided with perforations 4 to receive rods 5 which are in sliding engagement with the end brackets 2 to form a relatively wide base on which the grill is supported. When not in use, the rods 5 are removed and placed in the grid on basket 1.

Supporting brackets 6 are provided to support grills 7 in which the food is placed, the bracket 6 being provided with off-set tongues 8 which hook over the expanded metal, there being two tongues on each angle bracket spaced a substantial distance apart so that when placed in position the brackets 6 are rigidly supported on the expanded metal sidewalls. A bolt 9 is provided to brace the angle brackets 6 so that when assembled the angle brackets and the charcoal basket constitute a rigid structure, capable of supporting the food in the grills 7 on both sides of the broiler.

As shown in Fig. 4, a hopper 10 may be mounted on one side of the grill by an angle bracket 11, the hopper having flared extensions 12 to guide the charcoal brickettes. A gate 13 is provided to release the charcoal to permit it to drop in the basket.

As shown in Fig. 3, the charcoal-retaining grid or basket 1 is relatively narrow to utilize a minimum amount of charcoal to furnish an intense heat along the entire sidewalls on both sides of the grid. The food to be broiled, such as steaks 15, for example, are placed in the grills 7, which open, as shown in Fig. 2, and which are closed to firmly hold the food by bringing the handle portions together and slipping a ring 14 over the handles. One of the handle members is looped at the ends to slide over the supporting bracket 6 and the grill can be placed in any position, close or distant from the heat of the charcoal bed.

By constructing the grill, as shown, both sides of the grill may be simultaneously used, thus giving a large broiling capacity for a relatively small charcoal bed, and as any drippings from the steaks or other food will be downward, they will not drip on the charcoal to produce a flame, which would blacken the food, as in the horizontal type of broilers. The hopper construction employed in Fig. 4 is useful where grills are to be employed in restaurants, but for private use and outings the plain type, as shown in Figs. 1 to 3, is suitable.

By removing the rods 5 and lifting the angle brackets 6 and placing them inside of the basket 1, there is only one item to be transported which does not utilize much space.

Although one embodiment of the invention has been herein illustrated and described, it will be evident to those skilled in the art that various modifications may be made in the details of construction without departing from the principles herein set forth.

I claim:

1. A charcoal grill comprising a charcoal supporting basket of expanded metal having end brackets at the sides thereof, joined to the expanded metal, said end brackets having attachments for supporting the basket on its base, and food-supporting brackets extending from both sides of the basket at the top of the basket, said food-supporting brackets having tongues adapted to interact with the expanded metal to support the brackets on the sidewalls thereof.

2. A charcoal grill comprising expanded metal sidewalls integrally joined with an expanded metal base constituting a continuation of the sidewalls, sheet metal end brackets of substantially channel-shape attached to the sidewalls, having perforations at the base thereof, and rods disposed through the perforations of the end brackets to constitute a supporting base for the grill.

ALBERT J. AVETTA.